US010678686B2

(12) United States Patent
Wu et al.

(10) Patent No.: US 10,678,686 B2
(45) Date of Patent: Jun. 9, 2020

(54) ESTIMATION METHOD FOR READ AND WRITE ACCESS PERFORMANCE USING AVERAGE READ RETRY TIMES AND A VALID DATA WEIGHT RATIO

(71) Applicant: Innodisk Corporation, New Taipei (TW)

(72) Inventors: Hsi-Hsi Wu, New Taipei (TW); Ming-Sheng Chen, New Taipei (TW)

(73) Assignee: Innodisk Corporation, New Taipei (TW)

( * ) Notice: Subject to any disclaimer, the term of this patent is extended or adjusted under 35 U.S.C. 154(b) by 0 days.

(21) Appl. No.: 16/159,871

(22) Filed: Oct. 15, 2018

(65) Prior Publication Data

US 2019/0163622 A1    May 30, 2019

(30) Foreign Application Priority Data

Nov. 30, 2017    (TW) .............................. 106141735 A (51) Int. Cl.
*G06F 12/02*    (2006.01)
*G06F 3/06*    (2006.01)

(52) U.S. Cl.
CPC .......... *G06F 12/0246* (2013.01); *G06F 3/061* (2013.01); *G06F 3/0614* (2013.01); *G06F 3/0658* (2013.01); *G06F 12/0253* (2013.01); *G06F 2212/1032* (2013.01); *G06F 2212/1041* (2013.01); *G06F 2212/7205* (2013.01)

(58) Field of Classification Search
CPC ............. G06F 12/0246; G06F 12/0253; G06F 2212/1032; G06F 2212/1041; G06F 2212/7205; G06F 3/061; G06F 3/0614; G06F 3/0658
See application file for complete search history.

(56) References Cited

U.S. PATENT DOCUMENTS

| 2009/0319255 | A1* | 12/2009 | Vengerov | ............ | G06F 12/0253 703/22 |
| 2014/0189236 | A1* | 7/2014 | Li | ............ | G06F 3/061 711/114 |
| 2016/0232053 | A1* | 8/2016 | Lin | ............ | G06F 11/108 |
| 2016/0351227 | A1* | 12/2016 | Kishino | ............ | G11B 27/36 |
| 2018/0046527 | A1* | 2/2018 | Reusswig | ............ | G06F 11/076 |
| 2018/0253376 | A1* | 9/2018 | Nishikubo | ............ | G06F 3/0659 |

* cited by examiner

*Primary Examiner* — Glenn Gossage
(74) *Attorney, Agent, or Firm* — Rosenberg, Klein & Lee (57) ABSTRACT

An estimation method for read and write access performance adapted for a computer system including a host and a flash memory device is disclosed. The flash memory device includes a controller, and a flash memory module having a plurality of blocks. When the host transmits a writing performance query instruction, the controller executes a writing performance estimation process including determining whether at least one free block can accommodate data to be written. If Yes, a reply signal including an optimal writing performance is transmitted to the host; and if No, at least one block having data stored therein is selected for execution of a garbage collection process. When the host transmits a reading performance query instruction, the controller executes a reading performance estimation process including determining a threshold interval within which an average retry times of shift read is located to determine a corresponding estimated reading performance.

10 Claims, 5 Drawing Sheets

ESTIMATION METHOD FOR READ AND WRITE ACCESS PERFORMANCE USING AVERAGE READ RETRY TIMES AND A VALID DATA WEIGHT RATIO

FIELD OF THE INVENTION

The present invention relates to an estimation method for data access performance, more particularly, to an estimation method for read and write access performance of a flash memory device.

BACKGROUND OF THE INVENTION

With the evolution of semiconductor technology, the capacity of a flash memory device, for example, an SSD, has become larger and larger. The flash memory device has gradually become a main data storage media for servo hosts and video devices.

Since the servo host and the video device often need to write or read a large amount of data, the access performance of the flash memory device will directly affect the access speed of the data of the servo host or the video device. In the past, the servo host typically uses a testing software to test the access performance of the flash memory device. When the servo host tests the access performance of the flash memory device by the testing software, it will transmit some testing data to the flash memory device by a data transmission interface, and test the read and write speed of the flash memory device by the use of these testing data, so as to estimate the access performance of the flash memory device. The servo host uses the testing software to estimate the access performance of the flash memory device, which affects the estimated access performance due to the delay of transmission of the test data, or transmission interference.

For the above reason, the present invention provides an innovative method for estimating the read and write access performance of the flash memory device, in which the estimation of access performance is self-performed by the flash memory device to avoid transmission delay or interference to affect the estimation of the read and write access performance of the flash memory device, which is the object to be achieved by the present invention.

SUMMARY OF THE INVENTION

It is one objective of the present invention to provide an estimation method for write access performance, which is adapted for a computer system having a host and a flash memory device. When the host executes an estimation of writing performance for the flash memory device, it transmits a writing performance query instruction to the flash memory device. The flash memory device subsequently executes a writing performance estimation process after receiving the writing performance query instruction. The writing performance estimation process includes the flash memory device determining whether data space of at least one free block of a plurality of blocks can accommodate the amount of data to be written; if Yes, a reply signal indicating an optimal writing performance is transmitted to the host, and if No, at least one block with data stored therein from the plurality of blocks is selected for execution of a garbage collection process. The garbage collection process includes calculating a weight ratio based on the amount of valid data within the at least one selected block divided by the sum of the amount of valid data within the at least one selected block and the amount of data to be written so as to generate an estimated writing performance. The flash memory device subsequently transmits a reply signal including the estimated writing performance to the host.

It is another objective of the present invention to provide an estimation method for read access performance, in which the flash memory device records an average retry times of shift read, defines a plurality of threshold intervals based on the average retry times of shift read, and sets a plurality of estimated reading performances, each of which respectively corresponds to one of the threshold intervals. When the host executes an estimation of reading performance for the flash memory device, it transmits a reading performance query instruction to the flash memory device. The flash memory device executes a reading performance estimation process after receiving the reading performance query instruction. The reading performance estimation process includes the flash memory device determining the threshold interval within which the average retry times of shift read is located to thereby determine the corresponding estimated reading performance. The flash memory device subsequently transmits a reply signal including the estimated reading performance to the host.

To achieve the above objective, the present invention provides an estimation method for read and write access performance, which is adapted for a computer system having a host and a flash memory device, the flash memory device including a controller and a flash memory module, the flash memory module including a plurality of blocks that includes at least one free block with no data stored therein, the estimation method comprising: the host transmitting a writing performance query instruction, which indicates the amount of data to be written, to the flash memory device; and the controller of the flash memory device executing a writing performance estimation process, after receiving the writing performance query instruction, the writing performance estimation process including: determining whether data space of the at least one free block is sufficient to accommodate the amount of data to be written, if Yes, transmitting a reply signal indicating an optimal writing performance to the host, if No, executing a garbage collection process; the garbage collection process including: selecting at least one block having data stored therein from the plurality of blocks for execution of the garbage collection process; determining the amount of valid data within the at least one selected block; calculating a weight ratio based on the amount of valid data within the at least one selected block divided by a sum of the amount of valid data within the at least one selected block and the amount of data to be written; subtracting the weight ratio from the optimal writing performance to obtain an estimated writing performance; transmitting a reply signal indicating the estimated writing performance to the host; and executing the garbage collection for the at least one selected block to move the valid data in the at least one selected block into other blocks with data stored therein, and erasing remaining data in the at least one selected block, the at least one selected block thereby becomes a new at least one free block.

In one embodiment of the present invention, the at least one block selected by the controller for execution of the garbage collection process is a block having the least amount of valid data.

In one embodiment of the present invention, the method further comprising: the host sequentially writing data into the at least one free block after receiving the reply signal indicating the optimal writing performance or the estimated writing performance.

In one embodiment of the present invention, the method further comprising: determining whether a next writing performance query instruction has been received by the controller, after the garbage collection process has been executed; and executing the writing performance estimation process, again, after receiving the next writing performance query instruction.

In one embodiment of the present invention, each of the plurality of blocks includes a plurality of pages, the controller recording a retry times of shift read with respect to each of the pages, and obtaining an average retry times of shift read based on a sum of the retry times of shift read for all the pages of the plurality of pages divided by the total number of the pages.

In one embodiment of the present invention, the controller defines a plurality of threshold intervals according to the average retry times of shift read, and sets a plurality of estimated reading performances, each of the estimated reading performances corresponding to one of the threshold intervals.

In one embodiment of the present invention, the method further comprising: the host transmitting a reading performance query instruction to the flash memory device; and the controller of the flash memory device executing a reading performance estimation process after receiving the reading performance query instruction, the reading performance estimation process including: determining the threshold interval within which the average retry times of shift read is located to thereby determine the corresponding estimated reading performance; and transmitting a reply signal including the estimated reading performance to the host.

In one embodiment of the present invention, the method further comprising: determining whether a next reading performance query instruction has been received by the controller, after the reading performance estimation process has been executed; and executing the reading performance estimation process, again, after receiving the next reading performance query instruction.

The present invention further comprises an estimation method for read access performance, which is adapted to a computer system having a host and a flash memory device, the flash memory device including a controller and a flash memory module, the flash memory module including a plurality of blocks, each of the blocks including a plurality of pages, the estimation method comprising: the controller recording a retry times of shift read with respect to each of the pages and obtaining an average retry times of shift read based on a sum of the retry times of shift read for all the pages divided by the total number of the pages; the controller defining a plurality of threshold intervals according to the average retry times of shift read; setting a plurality of estimated reading performances, wherein each of the estimated reading performances corresponds to one of the threshold intervals; the host transmitting a reading performance query instruction to the flash memory device; and the controller of the flash memory device executing a reading performance estimation process, after receiving the reading performance query instruction, the reading performance estimation process including: determining the threshold interval within which the average retry times of shift read is located to thereby determine the corresponding estimated reading performance; and transmitting a reply signal including the estimated reading performance to the host.

DETAILED DESCRIPTION OF THE PREFERRED EMBODIMENT

Figure 1:
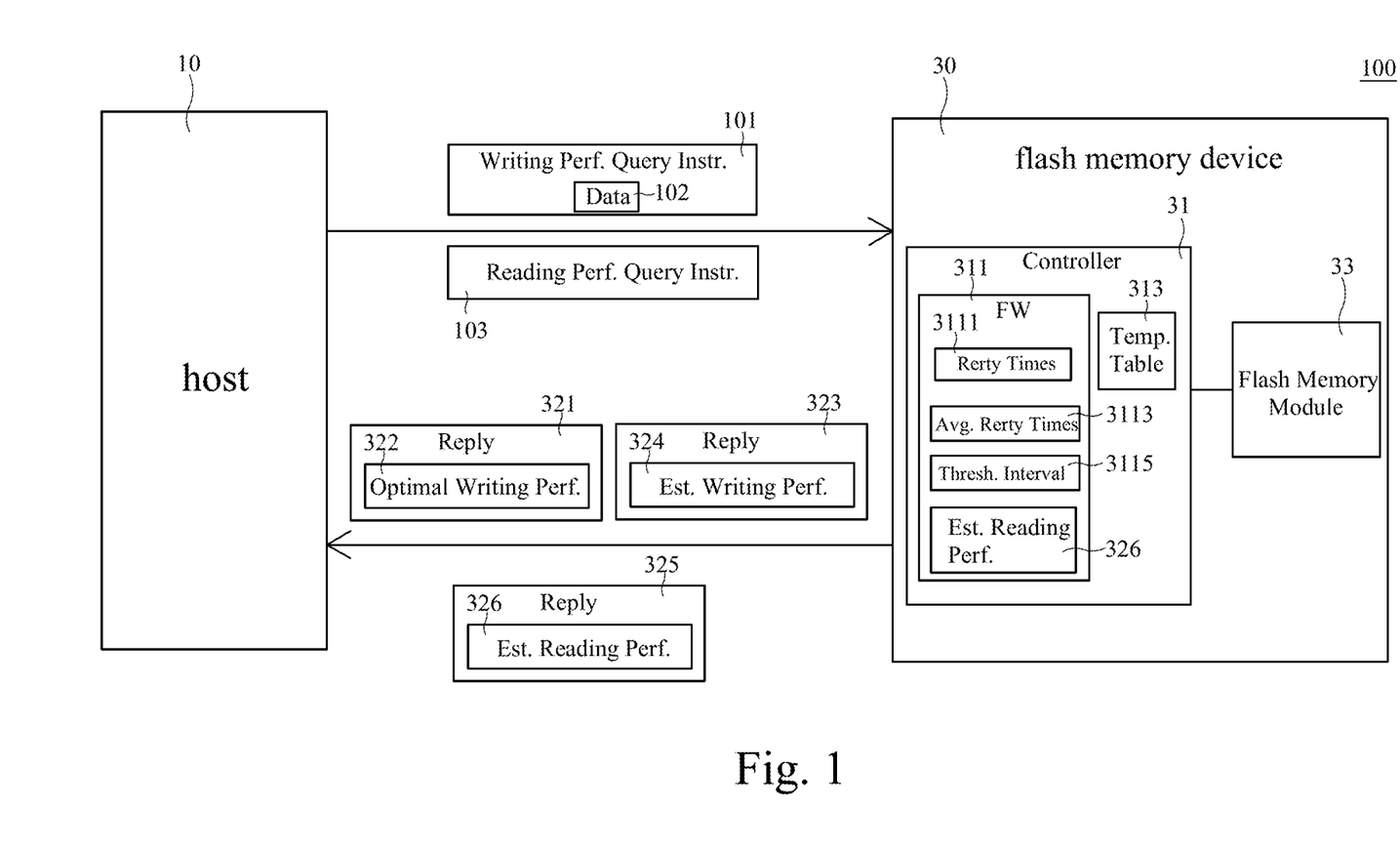
FIG. 1 is a structural diagram of a computer system according to one embodiment of the present invention.
Figure 2:
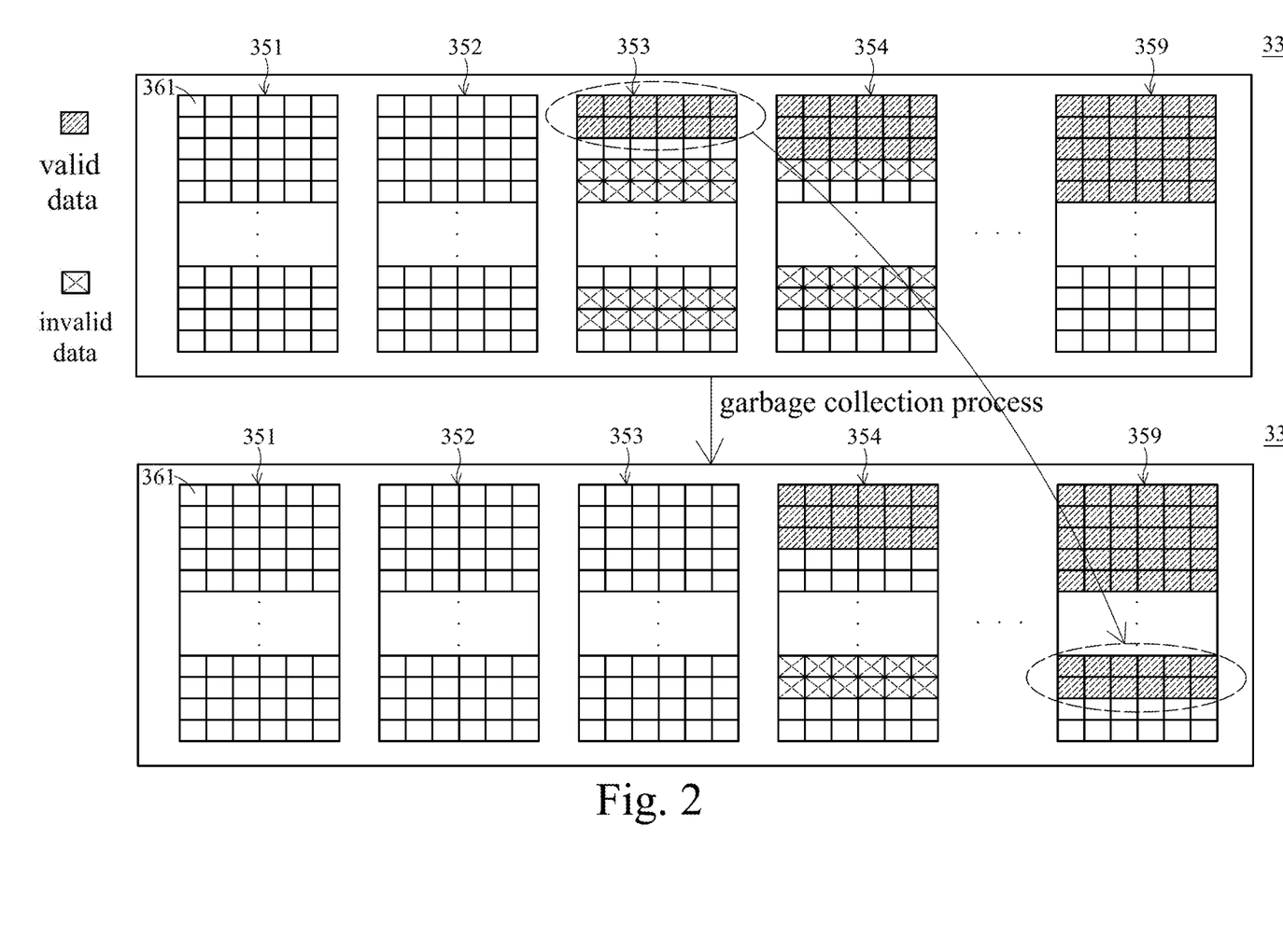
FIG. 2 is a schematic diagram of a data structure of a flash memory module according to one embodiment of the present invention.

Referring to FIGS. 1 and 2, there are shown a structural diagram of a computer system according to one embodiment of the present invention, and a schematic diagram of a data structure of a flash memory module according to one embodiment of the present invention. As shown in FIGS. 1 and 2, the computer system 100 of the present invention includes a host 10 and a flash memory device 30. The host 10 is used for estimating data access performance (such as writing performance/reading performance) of the flash memory device 30. The flash memory device includes a controller 31 and at least one flash memory module 33. As shown in FIG. 2, the flash memory module 33 includes a plurality of blocks 351, 352, 353, 354, and 359. Each of the blocks 351, 352, 353, 354, 359 include a plurality of pages 361. The size of each page 361 may be one of 4 k, 8 k, 16 k, or 32 k bytes. At least one of these blocks 351, 352, 353, 354, 359 is a free block having no data stored therein, for example, the blocks 351, 352 are the free blocks. The controller 31 includes a firmware 311 and a temporary table 313. The controller 31 executes an estimating process for read and write access performance by the use of the firmware 311, and records the data stored in each of the pages 361 as one of a valid data or an invalid data in the temporary table 313.

Figure 3:
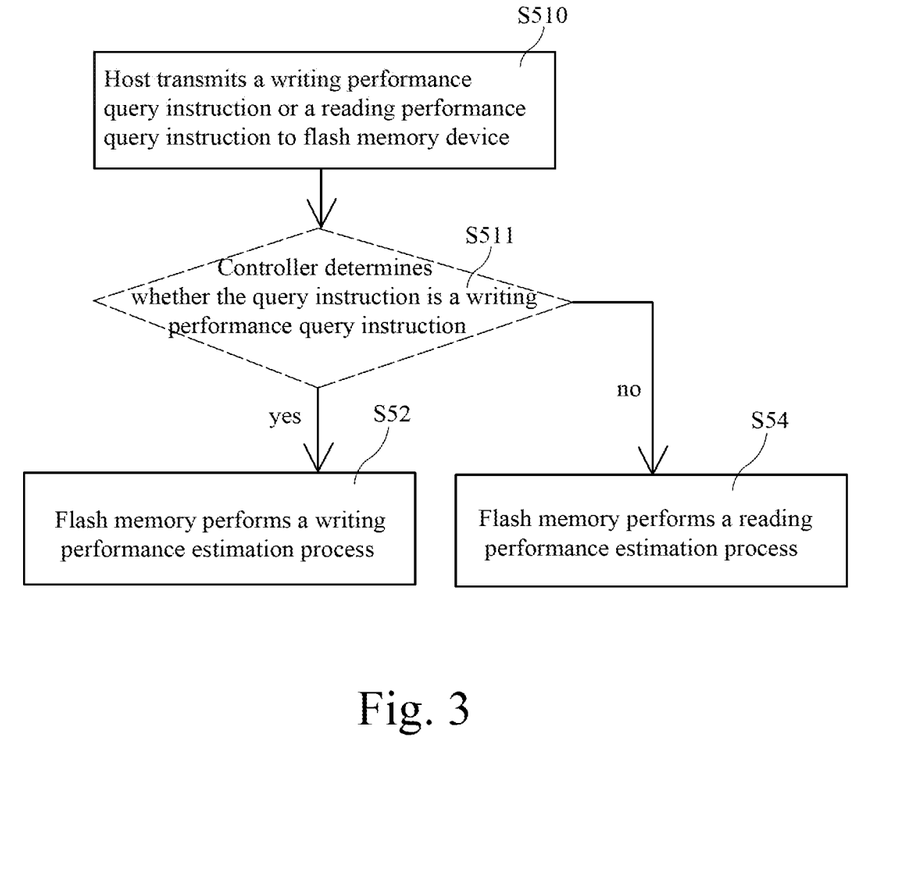
FIG. 3 is a flow chart of the computer system estimating a read and write access performance according to one embodiment of the present invention.
Figure 4:
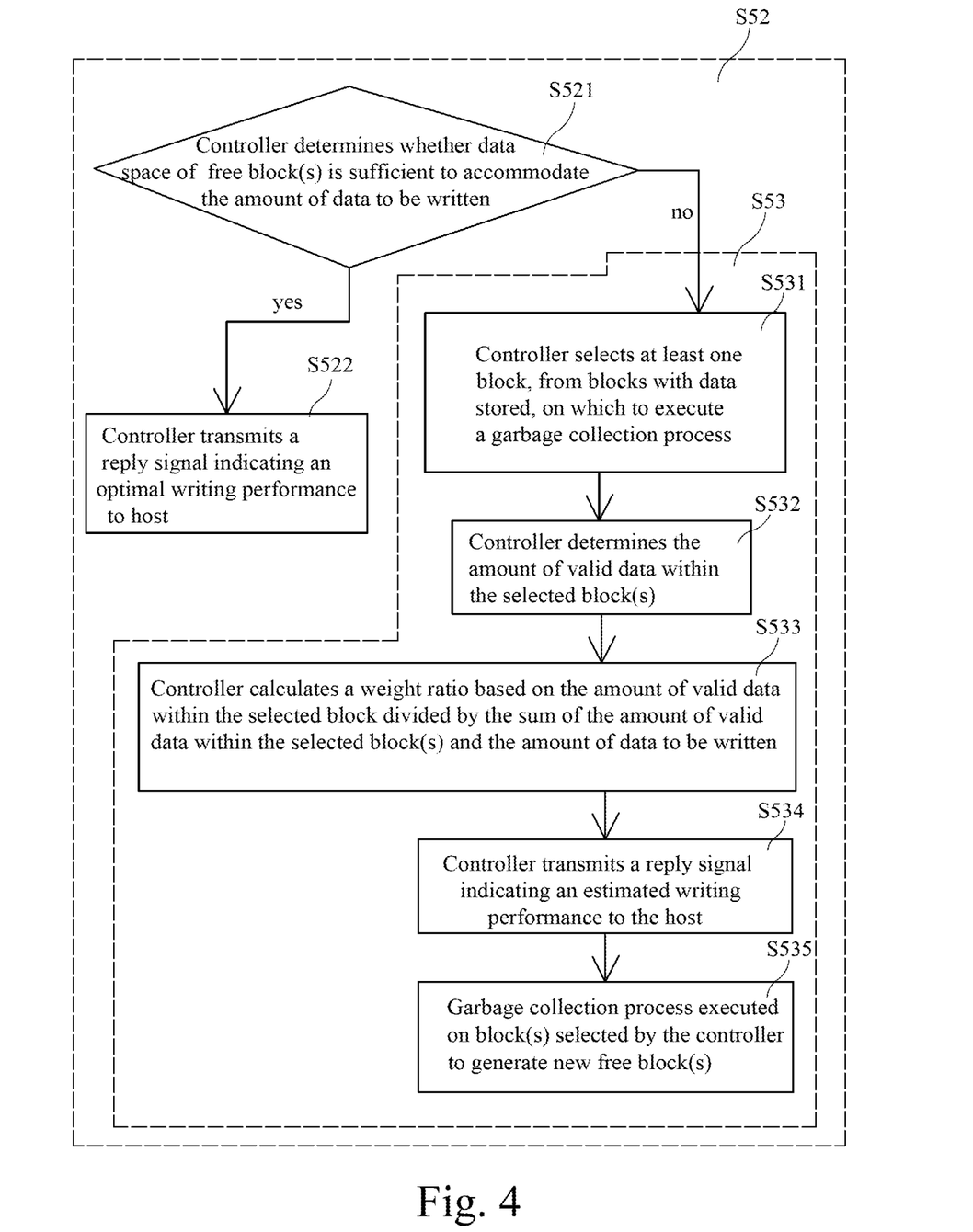
FIG. 4 is a flow chart of the computer system estimating a writing performance according to one embodiment of the present invention.

Referring to FIGS. 3 and 4, there are shown a flow chart of the computer system estimating a data access performance according to one embodiment, and a flow chart of the computer system estimating a writing performance according to one embodiment, with further reference to FIGS. 1 and 2. In step 510, when the host 10 executes an estimation of writing performance with respect to the flash memory device 30, the host transmits a writing performance query instruction 101 to the flash memory device 30. The writing performance query instruction 101 indicates the amount of data to be written to the flash memory device 30 by the host 10. The flash memory device 30 subsequently executes a writing performance estimation process S52, after receiving the writing performance query instruction 101.

In step S521 of the writing performance estimation process S52, as shown in FIG. 4, the controller 31 determines whether respective data spaces of the free blocks 351, 352 are sufficient to accommodate the amount of data 102 to be written. In step S522, if the controller 31 determines that the data spaces of the free blocks 351, 352, respectively, can accommodate the amount of data 102 to be written, it will transmit a reply signal 321 indicating an optimal writing performance (A1) 322 to the host 10, The optimal writing performance (A1) 322 is a percentage value, which is set to 100%. When the host 10 receives the reply signal 321 indicating the optimal writing performance (A1=100%) 322, it determines that the data spaces of the free blocks 351, 352 can accommodate the amount of data 102 to be written by the host 10, the data provided by the host 10 can thereby be written to the free blocks 351, 352 at the fastest write rate, for example, the highest write rate of the flash memory device 30.

For instance, the data space of each of the blocks 351, 352, 353, 354, 359 in the flash memory module 33 is 1 GB. When the host 10 notifies the flash memory device 30 that the amount of data of 1 GB is to be written to the flash memory module 33, the controller 31 of the flash memory device 30 determines that the current free data spaces (such as the free blocks 351, 352) are 2 GB, are sufficient to accommodate the amount of data 102 to be written by the host 10, and therefore a message including the optimal writing performance (A1=100%) 322 is transmitted to the host 10, such that the 1 GB of data can be written to the free blocks 351 or 352 by the host 10 at the fastest write rate.

Figure 5:
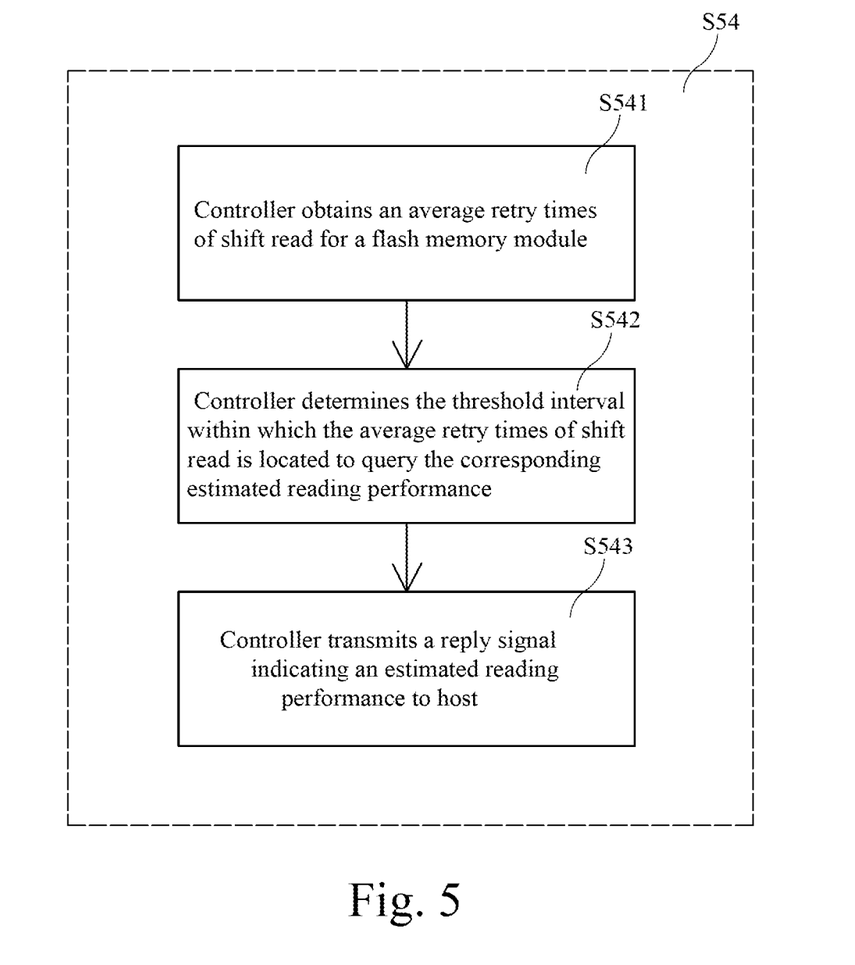
FIG. 5 is a flow chart of the computer system estimating a reading performance according to one embodiment of the present invention.

On the contrary, if the controller 31 of the flash memory device 30 determines that the data spaces of the free blocks 351, 352 are unable to accommodate the amount of data 102 to be written, a garbage collection process S53, as shown in FIGS. 3 and 5, is executed for one or more blocks 353, 354, 359 (having data stored therein) to clear all the data stored within the blocks 353, 354, and/or 359 and therefore generate more free blocks. For instance, when the host 10 notifies the flash memory device 30 that it wants to write the amount of data of 3 GB to the flash memory module 33, the controller 31 of the flash memory device 30 determines that the current free data spaces (such as the free blocks 351, 352) are only 2 GB, which are not sufficient to accommodate the amount of data 102 of 3 GB to be written. Therefore, the controller 31 will execute the garbage collection process for the block 353, 354, or 359 to clear up the data stored within the block 353, 354, or 359 such that the block 353, 354, or 359 can become a new free block. The flash memory device 30 moves valid data from the block where the garbage collection process is executed; however, the movement of data will affect the speed at which the host 10 writes data to the flash memory device 30. Accordingly, the flash memory device 30 of the present invention calculates the writing portion affected by the movement of data during the execution of the garbage collection process, and subtracts the affected writing portion from the optimum writing performance (A1) 322 to thereby calculate the actual writing performance of the flash memory device 30 during the execution of the garbage collection process.

In step S531 of the garbage collection process S53, the firmware 311 of the controller 31 selects at least one block (such as the block 353), from these blocks 353, 354, 359, with data stored, for execution of the garbage collection process. In one preferred embodiment of the invention, the firmware 311 of the controller 31 will preferentially select the block having the least amount of valid data as a block for execution of the garbage collection process. For example, if the amount of valid data in the block 353 is 200 megabytes MB, the amount of valid data in the block 354 is 300 MB, and the amount of valid data in the block 359 is 500 MB, the controller 31 preferentially selects the block 353 on which to execute the garbage collection process. Next, in step S532, the controller 31 determines the amount of valid data within the selected block 353, for example, 200 MB. The controller 31 calculates a weight ratio based on the amount of valid data within the selected block 353 divided by a sum of the amount of valid data within the selected block 353 and the amount of data to be written.

For example, $$Z = \frac{X}{X+Y} = \frac{200 \ MB}{200 \ MB + 3 \ GB} = 6.25\%$$

wherein X is the amount of valid data within the selected block 353, Y is the amount of data to be written, and Z is the weight ratio. The weight ratio (Z) is subtracted from the optimal writing performance (A1) 322 to obtain an estimated writing performance (A2) 324 of the flash memory device 30. For example, A2=A1−Z=100%−6.25%=93.75%. In step S534, the controller 31 transmits a reply signal 323 including the estimated writing performance (A2=93.75%) 324 to the host 10 after the estimated writing performance (A2) 324 has been obtained, and the host 10 can thereby determine the writing performance of the flash memory device 30 during the garbage collection process. In step S535, the controller 31 moves all of the valid data within the selected block 353 into another block 359, and erases all remaining data in the selected block 353 such that the selected block 353 becomes a new free block. Furthermore, the controller 31 writes data into the free block 351, 352 or 353 at a speed of the estimated writing performance (A2) when the garbage collection process is operating in the selected block 353. After the controller 31 has executed the garbage collection process, it returns to step S510 to determine whether a next writing performance query instruction 101 has been received; if so, the writing performance estimation process S52, as seen in FIGS. 3 and 4, is executed for the flash memory device 30, again.

Referring to FIG. 5, there is shown a flow chart of the computer system estimating a reading performance according to one embodiment, with further reference to FIGS. 1 and 3. In general, a threshold voltage of a memory cell (such as a NAND flash memory cell) shifts because the flash memory device 30 gradually ages with time. Therefore, the controller 31 needs to perform multiple retries of shift read for the pages 361 of the flash memory module 33 so as to read out correct data. Accordingly, the controller 31 records a retry times 3111 of shift read with respect to each of the pages 361 of the flash memory module 33, and obtains an average retry times 3113 of shift read based on a sum of the retry times 3111 of shift read for all the pages 361 divided by a total number of the pages 361. The firmware 311 of the controller 31 defines a plurality of threshold intervals 3115 according to the average retry times 3113 of shift read, and sets a plurality of estimated reading performances (B1) 326, each of which respectively corresponds to one of the threshold intervals 3115. If the average retry times 3113 of shift read is low, this corresponds to a higher estimated reading performance (B1) 326; on the contrary, if the average retry times 3113 of shift read is high, this corresponds to a lower estimated reading performance (B1) 326. For example, if the average retry times 3113 of shift read is zero to one, such average retry time will be located at a first threshold interval and correspond to an estimated reading performance (B1) 326 of 100%; if the average retry times 3113 of shift read is one to two, such average retry time will be located at a second threshold interval and correspond to an estimated reading performance (B1) 326 of 90%; if the average retry times 3113 of shift read is two to three, such average retry time will be located at a third threshold interval and correspond to an estimated reading performance (B1) 326 of 80%; if the average retry times 3113 of shift read is three to four, such average retry time will be located at a fourth threshold interval and correspond to an estimated reading performance (B1) 326 of 70%; if the average retry times 3113 of shift read is more than five, such average retry time will be located at a fifth threshold interval and correspond to an estimated reading performance (B1) 326 of less than 50%.

In step S510, the host 10 transmits a writing performance query instruction 101 or a reading performance query instruction 103 to the flash memory device 30. In step S511, when the controller 31 of the flash memory device 30 receives a query instruction related to the read or write access performance, it will determine whether the received query instruction is a writing performance query instruction 101 or a reading performance query instruction 103. If the received query instruction is a writing performance query instruction 101, the controller 31 executes the writing performance estimation process S52; otherwise, the controller 31 executes the reading performance estimation process S54.

In step S541 of the reading performance estimation process S54; the controller 31 obtains the average retry times 3113 of shift read related to the flash memory module 33 from the firmware 311. In step S542, the controller 31 determines the threshold interval 3115 within which the average retry times 3113 of shift read is located to thereby determine the corresponding estimated reading performance (B1) 326. In step S543, the controller 31 transmits a reply signal 325 including the estimated reading performance (B1) 326 to the host 10 so that the host 10 knows the current reading performance of the flash memory device 30, and subsequently reads data from the flash memory module 33 at a speed of the estimated reading performance (B1) 326, or knows the reading performance of the flash memory module 33 based on the estimated reading performance (B1) 326. After the step S543 has executed, steps S510 and S511 are executed to determine whether a next reading performance query instruction 103 has been transmitted from the host 10; if so, the controller 31 executes the reading performance estimation process S54, again.

Summing up, the computer system 100 of the present invention provides a mechanism for estimating the read and write access performance of the flash memory device 30, in which the estimation of the writing performance or the reading performance for the flash memory device 30 is self-executed by the flash memory device 30 so as to obtain an accurate estimation result of writing performance or reading performance. The estimation result of writing performance or reading performance will be transmitted to the host 10, such that the host 10 knows the reading and writing performance of the flash memory device 30.

The above disclosure is only the preferred embodiment of the present invention, and should not be used for limiting the scope of the present invention. All equivalent variations and modifications on the basis of shapes, structures, features, and spirits described in the claims of the present invention should be included in the claims of the present invention.

What is claimed is:

1. An estimation method for read and write access performance adapted for a computer system including a host and a flash memory device, the flash memory device including a controller and a flash memory module, the flash memory module including a plurality of blocks having at least one free block, the at least one free block having no data stored therein, the estimation method comprising:

transmitting a writing performance query instruction to the flash memory device, the writing performance query instruction indicating the amount of data to be written; and executing a writing performance estimation process by the controller of the flash memory device after receiving the writing performance query instruction, the writing performance estimation process including:

determining whether data space of the at least one free block is sufficient to accommodate the amount of data to be written, if yes, transmitting a reply signal indicating an optimal writing performance to the host, if no, executing a garbage collection process;

the garbage collection process including:

selecting at least one block from these the plurality of blocks having data stored therein;

determining the amount of valid data within the at least one selected block;

calculating a weight ratio based on the amount of valid data within the at least one selected block divided by the sum of the amount of valid data within the at least one selected block and the amount of data to be written;

subtracting the weight ratio from the optimal writing performance to obtain an estimated writing performance;

transmitting a reply signal indicating the estimated writing performance to the host; and moving the valid data in the at least one selected block into other blocks with data stored therein, and erasing remaining data in the at least one selected block, the at least one selected block thereby becomes a new at least one free block.

2. The estimation method according to claim 1, wherein the at least one selected block is a block from the plurality of blocks having the least amount of valid data.

3. The estimation method according to claim 1, further comprising:

writing data sequentially into the at least one free block of the flash memory module after receiving the reply signal indicating the optimal writing performance or the estimated writing performance.

4. The estimation method according to claim 1, further comprising:

determining whether a next writing performance query instruction has been received by the controller, after the garbage collection process has been executed; and executing the writing performance estimation process, again, after receiving the next writing performance query instruction.

5. The estimation method according to claim 1, wherein each of the plurality of blocks includes a plurality of pages, the controller recording a retry times of shift read with respect to each of the pages, and calculating an average retry times of shift read based on a sum of the retry times of shift read for all the plurality of pages divided by a total number of the plurality of pages.

6. The estimation method according to claim 5, wherein the controller defines a plurality of threshold intervals according to the average retry times of shift read, and sets a plurality of estimated reading performances, each of the estimated reading performances corresponding to one of the threshold intervals.

7. The estimation method according to claim 6, further comprising:

transmitting a reading performance query instruction to the flash memory device via the host; and executing a reading performance estimation process by the controller of the flash memory device after receiving the reading performance query instruction, the reading performance estimation process including:

determining the threshold interval within which the average retry times of shift read is located to determine the corresponding estimated reading performance; and transmitting a reply signal including the estimated reading performance to the host.

8. The estimation method according to claim 7, further comprising:

determining whether a next reading performance query instruction has been received by the controller, after the reading performance estimation process has been executed; and executing the reading performance estimation process, again, after receiving, the next reading performance query instruction.

9. An estimation method for read and write access performance adapted for a computer system including a host and a flash memory device, the flash memory device including a controller and a flash memory module, the flash memory module including a plurality of blocks, each of the blocks including a plurality of pages, the estimation method comprising:

recording retry times of a shift read, by the controller, with respect to each page of the plurality of pages, and calculating an average of the retry times of the shift read based on a sum of the retry times of the shift read for all the pages of the plurality of pages divided by a total number of the pages of the plurality of pages;

defining a plurality of threshold intervals, by the controller, according to the average retry times of the shift read;

setting a plurality of estimated reading performances, wherein each of the estimated reading performances corresponds to one of the threshold intervals;

transmitting a reading performance query instruction to the flash memory device via the host; and executing a reading performance estimation process by the controller of the flash memory device, after receiving the reading performance query instruction, the reading performance estimation process including:

determining the threshold interval within which the average retry times of the shift read is located to determine the corresponding estimated reading performance; and transmitting a reply signal including the estimated reading performance to the host.

10. The estimation method according to claim 9, further comprising:

determining whether a next reading performance query instruction has been received by the controller, after the reading performance estimation process has been executed; and executing the reading performance estimation process, again, after receiving the next reading performance query instruction.

* * * * *